United States Patent [19]

Garoff

[11] Patent Number: 4,780,440
[45] Date of Patent: Oct. 25, 1988

[54] CATALYST COMPONENT FOR ALPHA OLEFINE-POLYMERIZING CATALYSTS AND PROCEDURE FOR MANUFACTURING THE SAME

[75] Inventor: Thomas Garoff, Helsinki, Finland

[73] Assignee: Neste Oy, Finland

[21] Appl. No.: 34,289

[22] Filed: Apr. 1, 1987

[30] Foreign Application Priority Data

Apr. 1, 1986 [FI] Finland .................................. 861387

[51] Int. Cl.$^4$ .............................................. C08F 4/64
[52] U.S. Cl. .................... 502/107; 502/123; 502/125; 502/126; 502/127; 502/133; 502/134; 526/124
[58] Field of Search ............... 502/107, 123, 125, 126, 502/127, 133, 134

[56] References Cited

U.S. PATENT DOCUMENTS

| | | | |
|---|---|---|---|
| 3,953,414 | 4/1976 | Galli et al. ........................ | 502/134 X |
| 4,107,415 | 8/1978 | Giannini et al. ................. | 502/125 X |
| 4,226,741 | 10/1980 | Luciani et al. ................... | 502/127 X |
| 4,487,845 | 12/1984 | Triplett .............................. | 502/107 |
| 4,529,716 | 7/1985 | Banzi et al. ...................... | 502/134 X |
| 4,532,313 | 7/1985 | Matlack ............................ | 502/134 X |
| 4,544,717 | 10/1985 | Mayr et al. ...................... | 502/127 X |

*Primary Examiner*—Patrick P. Garvin
*Attorney, Agent, or Firm*—Steinberg & Raskin

[57] ABSTRACT

A catalyst component for alpha olefine-polymerizing catalysts which comprise an organoaluminum compound, an external electron donor, and a solid catalyst compound obtained when a solid carrier component containing magnesium has reacted with a titanium halide compound, in addition to a procedure for manufacturing the same. The catalyst component is produced by reacting a solid carrier component with a titanium halide compound with or without the presence of an internal electron donor. The solid carrier component is prepared by:

(a) mixing an aqueous solution or alcoholic suspensions of magnesium sulfate with an equeous or alcoholic solution of barium or calcuim chloride,
(b) separating the undissolved material therefrom,
(c) evaporating the remaining solution until dry,
(d) heating the obtained residue at 130° to 150° C.,
(e) dissolving the heated residue in alcohol,
(f) drying the alcoholic solution with the aid of periodic azeotropic distillation, and
(g) precipitating the solid component from the remaining solution.

4 Claims, No Drawings

CATALYST COMPONENT FOR ALPHA OLEFINE-POLYMERIZING CATALYSTS AND PROCEDURE FOR MANUFACTURING THE SAME

BACKGROUND OF THE INVENTION

The invention concerns a catalyst component for an alpha olefine-polymerizing catalyst, which comprises an organoaluminum compound, an electron donor, and a solid catalyst component which is obtained when a compound containing magnesium has reacted with a titanium halide compound. The present invention is also directed to a procedure for manufacturing this catalyst component, and to a procedure for polymerizing the alpha olefines, especially propylene, which makes use of the catalyst component.

Catalysts which have been manufactured according to the prior art with high activity for polymerizing alpha olefines include an aluminum alkyl compound, an electron donor, and a halogenated titanium compound on a carrier substance comprising various magnesium compounds. Chlorinated magnesium compounds have generally been used as the magnesium compound, which may be, for instance, water-free magnesium chloride alone or together with other magnesium compounds, or an organic magnesium compound which has been prepared by halogenating organic magnesium compounds with the aid of chlorine-containing compounds.

In polymerizing catalysts of this type, the properties of the solid carrier component have significant influence upon the properties of the ultimate catalyst, e.g. upon its activity. These properties can be substantially influenced through the mode of manufacturing of the carrier component.

The present invention concerns a catalyst component in which the carrier component has been prepared from magnesium sulfate or from minerals containing the same. The minerals may be natural minerals or synthetic minerals. The use of various magnesium salts for carriers for magnesium chloride treated with titanium halides for preparing inert carrier components for Ziegler-Natta catalysts for the purpose of polymerizing olefines is not norel per se. However, it has turned out to be difficult to manufacture active Ziegler-Natta catalysts exclusively from magnesium sulfate and from minerals containing the same, in particular those catalysts for the polymerizing of propylene, because in these processes the catalysts are highly sensitive to moisture and to the crystallized water contained in the carrier. Even minimal quantities of crystallized water already significantly reduce the activity of the catalyst. Magnesium sulfate and minerals containing magnesium sulfate generally contain considerable quantities of crystal water and are therefore unsuitable for use in propylene-polymerizing catalysts.

SUMMARY OF THE INVENTION

Accordingly, it is an object of the present invention to improve polymerizing of olefines, notably propylene.

It is also an object of the present invention to provide a new and improved catalyst component for carrying out the polymerizing of the olefines.

It is yet a further object of the present invention to provide for the production of catalyst components from magnesium sulfate.

It is a further object to provide a method for manufacturing a catalyst component for use in the polymerizing of olefines.

These and other objects are attained by the present invention which is directed to a catalyst component for an alpha olefine-polymerizing catalyst which comprises an organoaluminum compound, an external electron donor, and a solid catalyst component obtained when a solid carrier component containing magnesium has reacted with a titanium halide compound and which is free of the drawbacks noted above and therefore suitable for use in the polymerizing of the olefines, notably propylene. In particular, the catalyst component (i.e. carrier component) for the alpha olefine polymerizing is prepared by (a) mixing an aqueous solution or alcoholic suspension of magnesium sulfate with an aqueous or alcoholic solution of barium or calcium chloride, (b) separating the undissolved material therefrom, (c) evaporating the remaining solution until dry, (d) heating the thus-obtained residue to a temperature of about 130°–150° C., (e) dissolving the thus-heated residue in alcohol, (f) subjecting the thus-obtained alcoholic solution to azeotropic distillation to remove crystallized water therefrom, and (g) precipitating the solid carrier component from the remaining solution.

The solid carrier component formed in step (g) can then be reacted with a titanium halide, with or without the presence of an internal electron donor, to form a catalyst component which is then combined with the organoaluminum compound and an external electron donor to serve as a catalyst in the olefine-polymerizing reaction.

The present invention is also directed to a method for manufacturing a catalyst component for an alpha olefine-polymerizing catalyst comprising an organoaluminum compound, an external electron donor, and a solid catalyst component containing magnesium which is obtained when a solid carrier component containing magnesium has reacted with a titanium halide compound. The method of the present invention is characterized by preparing the catalyst (i.e. solid carrier) component by the method set forth is steps (a) through (g) above.

The solid carrier component formed in step (g) is then reacted with a titanium halide compound, with or without the presence of an internal electron donor, to form a catalyst component which is then combined with the organoaluminum compound and external electron donor for carrying out the alpha-olefine polymerizing.

The present invention is also directed to a method for polymerizing olefines, especially propylene, in which the polymerizing is carried out in the presence of the catalyst component of the present invention.

The catalyst component of the present invention, and the solid carrier component (which is reacted with the titanium halide to form the catalyst component) of the invention provide several important advantages over carrier components containing magnesium which have been prepared by conventional synthesis techniques. Thus, it is possible according to the present invention to use magnesium sulfate with crystal water or in dry form as starting material. The synthesis is simple, particularly when the solvent is an alcohol. Also, it is possible to use not only pure magnesium sulfates as the starting material, but also to use any of a multitude of magnesium minerals containing sulfate, which may contain 1-15 mol crystal water.

The first step in preparing the catalyst component of the invention is preparing the solution, or suspension, from the magnesium sulfate to be used for starting material. For solvent water or an alcohol, such a methanol, ethanol or propanol, may be used. When using alcohol, a suspension of magnesium sulfate is obtained, while a solution is obtained when using water. The water used for dissolving then has to be removed at a later stage. The most suitable choice of alcohol is ethanol. The quantity of magnesium sulfate in the solution may vary within wide limits. The usable range is with 1 to 50% by weight of magnesium sulphate.

As taught by the invention, bringing the magnesium sulfate solution, or suspension, into contact with barium or calcium chloride is preferably carried out so that an aqueous, or alcoholic solution is prepared from barium or calcium chloride, its concentration varying from 1% to saturated solution. The magnesium sulfate solution, or suspension, is thereafter mixed with barium or calcium chloride solution, whereby barium or calcium chloride is precipitated. Barium or calcium chloride solution is advantageously used in stoichiometric proportion to magnesium, although this is not indispensable.

The precipitated barium or calcium sulfate can easily be separated from the solution by centrifuging or sedimenting. In case alcohol has been used as the solvent, the clear solution containing the magnesium component leads directly to the phase in which the crystal water is removed. If water is used for solvent, the clear solution containing the magnesium component is evaporated until dry and warmed up slightly at 110°-130° C. for removing the extra water and for reducing the crystal water quantity. The heating time may vary from 0.5 to 2 hours, whereafter the residue is dissolved in alcohol, preferably in ethanol, and conducted to the crystal water removal step.

As taught by the invention, the crystal water is removed by distilling, with the aid of periodic azeotropic distillation. During this distillation, an azeotropic mixture of alcohol and water escapes from the solution, whereby new crystal water is transferred to the alcohol solution. By adding new water-free alcohol and by repeated distillation, total removal of crystal water from the magnesium component is accomplished.

The number of azeotropic distilling runs required depends on the amount of water present in the solution and on the intended use of the catalyst. If the catalyst is intended to be used in polymerizing ethylene, fewer runs are needed, for instance 1 to 5 runs. When manufacturing a carrier component for propylene polymerizing, nearly water-free carrier is required, and experience has shown that this is achieved if the number of distilling runs is 9 to 15, advantageously 10 to 12. Hereby, the water content of the carrier component can be brought down far enough for propylene-polymerizing catalysts.

After drying out the crystal water, precipitation of the magnesium carrier component is effected by transferring the dried alcohol solution into the cold solvent, whereby the magnesium component will precipitate. Suitable solvents are common organic hydrocarbons used as solvents. Heptane is a highly appropriate solvent for the reason that its boiling point is high enough so that in the titanizing step which has to be carried out subsequently titanium has time to react, and on the other hand it is low enough to avoid melting of the carrier component in the titanizing step.

When the alcohol, e.g. ethanol solution-containing magnesium component is added into cold heptane, the carrier component is precipitated in finely divided form. After washing and drying, the carrier component is titanized with the aid of titanium tetrachloride in a manner known in itself in the art, for producing the catalyst component.

Titanizing may be accomplished for instance by mixing the solid carrier component with a titanium halogen compound once or several times. Before, during or after the titanizing process, the catalyst component may furthermore be treated with the aid of an internal electron donor compound. The titanizing is preferably accomplished in two steps, between which may be added an internal electron donor, which is usually an amine, ether or ester of its type. A suitable donor is, for instance, diisobutylphthalate, of which the quantity may be 0.05 to 0.3, most appropriately 0.2, mol/mol Mg.

In the first step a low temperature is to be recommended, e.g. below 0° C., preferably below $-20°$ C. The second titanizing step may be carried out at higher temperature, e.g. at 85° to 110° C., a reaction time of 1-1.5 hours being sufficient. The solid reaction product is then separated from the liquid phase and washed with hydrocarbon solvents to remove impurities and derivatives. The catalyst component may be dried in light vacuum or in nitrogen gas at room temperature, or at slightly elevated temperature, and it may be homogenized by grinding it in a ball mill.

Thereafter, the catalyst component of the invention may be used to polymerize alpha olefines by allowing it to come into contact with an Al compound and an external compound releasing electrons. In the role of external compounds releasing electrons may be used, for instance, amines, ethers, esters (preferably alkyl and arylesters or aromatic carboxylic acids) or silane compounds (alkyl/aryl silanes), examples of such being, among others, the methyl and ethyl esters of benzoic, toluic and phthalic acid, isobutylesters of phthalic acid, triethoxysilanes, etc. Said electron donors are compounds which are able to enter into complexes with Al alkyls. The stereo-specificity of the catalyst can be improved with their aid.

The external compound releasing electrons, or donor, and the Al alkyl are mixed together, the molar proportion of the compound releasing electrons to the Al compound being about 20 and the Al/Ti molar proportion being between 10 and 300, depending on the polymerizing system. Polymerizing may be carried out either as slurry or bulk polymerizing, or in the gas phase.

Catalyst components and catalysts prepared as taught by the invention may be used to polymerize alpha olefines, such as ethylene, propylene and butylene, by the slurry, bulk and gas phase methods, but the catalyst components of the invention are particularly well suited for use in polymerizing propylene because the quantity of crystal water in the carrier substance is singularly low and, as a result, the activity of the catalysts is particularly high, especially regarding polymerizing of propylene.

DESCRIPTION OF PREFERRED EMBODIMENTS

The following examples are given to illustrate the present invention. The scope of the invention is not, however, meant to be limited thereto.

Example 1

50 g $MgSO_4.7H_2O$ were suspended in 100 ml water. Thereafter, 44.5 g $CaCl_2.2H_2O$ were added in 100 ml water. The suspension was centrifuged for 10 min. at 3000 rpm. The solution was evaporated until dry and heated for 1 hr. at 140° C. The salt was poured, with mixing, into 200 ml. ethanol. The ethanol solution was centrifuged for 10 min. (3000 rpm). The clear solution was transferred to a three-necked flask (1 liter) in which the drying of the ethanol carrier component was carried out by azeotropic distillation. The drying process consumed 500 ml absolute ethanol (moisture content <100 ppm). The distillation took place in a slow nitrogen flow. The dry (moisture content <400 μg $H_2O$/0.1 ml) hot ethanol/carrier solution was transferred into cold heptane (500 ml), in which the carrier component crystallized. The carrier component was then kept in inert conditions ($N_2$). The extra ethanol was washed off in two heptane washings, whereafter the carrier component was transferred into cold titanium tetrachloride (500 ml, −20° C.). After the mixture had warmed up to room temperature, 0.1 mol/mol Mg of diisobutylphthalate were added thereto. The mixture was boiled for 1 hr. at 100° C., whereafter the carrier component was allowed to settle and the $TiCl_4$ colution was exchanged for a new solution, and the treatment was repeated for 1 hr. at 110° C. The completed catalyst component was washed with heptane and dried in nitrogen. The yield of catalyst was 8.0 g, and the catalyst contained: Mg 13.7%, Ti 2.9%, Cl 47.0%, and Ca 0.50%.

The carrier component thus prepared was used for propylene polymerizing, adding the same into a 2-liter polymerizing reactor catalyst which had been prepared by mixing, as aluminium alkyl compound, triethylaluminium and, as Lewis compound, diphenylmethoxysilane (Al/donor mole proportion: 20) in 50 ml heptane and admixing to this, after 5 minutes, carrier component so as to make the Al/Ti molar proportion 200. Polymerizing was carried out in conditions as follows: propylene partial pressure 9.0 bar, hydrogen partial pressure 0.3 bar, temperature 70° C., and polymerizing time 3 hrs.

The activity of the catalyst was 4.1 kg PP per g of catalyst in 3 hours. The bulk density of the polymer was 0.31 g/ml, isotacticity 89.4%, and 95% of the particle distribution were in the range 0.2 mm to 1.0 mm.

Example 2

25 mg $MgSO_47H_2O$ were suspended in 100 ml water. Thereafter, 24.8 g $BaCl_2.2H_2O$ were added in 100 ml water. The suspension was centrifuged for 10 min. at 3000 rpm. The solution was evaporated until dry and calcinated for 1 hr. at 140° C. The salt was poured, with mixing, into 200 ml ethanol. The ethanol solution was centrifuged for 10 min. (3000 rpm). The clear solution was poured into a three-necked flask (1 liter), in which the drying of the ethanol/carrier solution was carried out with the aid of azeotropic distillation. The drying consumed 500 ml absolute ethanol (moisture content less than 100 ppm). The distillation took place in slow nitrogen flow. Dry (moisture content <400 ug $H_2O$/0.1 ml) hot ethanol/carrier solution was transferred into cold heptane (500 ml, −20° C.). After the mixture had warmed up to room temperature, 0.1 mol/mol Mg of diisobutylphthalate were added thereto. The mixture was boiled for 1 hr. at 100° C., whereafter the catalyst component was allowed to settle and the $TiCl_4$ solution was exchanged for new solution, the treatment was repeated for 1 hr. at 110° C. The completed catalyst component was washed with heptane and dried with nitrogen. The yield was 8.0 g and the catalyst contained: Mg 15.9%, Ti 3.0%, Cl- 54.0%, and $SO_4$ - 0.03%.

As in Example 1, propylene was polymerized with the above catalyst component, and its activity was 6.9 kg PP per g of catalyst in 3 hours. The bulk density was 0.20 g/ml and isotacticity 94%, and 95% of the particle distribution were in the range 0.2 to 1.0 mm.

Example 3

49 g $MgSO_4.7H_2O$ and 22.2 g $CaCl_2$ were suspended in 500 ml ethanol. The solution was warmed, with mixing, for 4 hours at 60° C. and allowed to settle for 16 hours, and the ethanol solution was separated by decanting. The solution was transferred to a three-necked flask in which drying of the ethanol/carrier component was carried out with azeotropic distillation. The drying consumed 1500 ml absolute ethanol (moisture content less than 100 ppm). When the dry (moisture content <400 μg $H_2O$/0.1 ml) hot ethanol/carrier solution was transferred into cold heptane (500 ml, −20° C.), the carrier component crystallized. The carrier component was then processed under inert conditions ($N_2$). The extra ethanol was washed off with two heptane washings and thereafter the carrier component was transferred into cold titanium tetrachloride (500 ml, −20° C.). After the mixture had warmed up to room temperature, 0.1 mol/mol Mg of diisobutylphthalate were added thereto. The mixture was boiled for 1 hr at 110° C., whereafter the catalyst component was allowed to settle and the $TiCl_4$ solution was exchanged for new solution and the treatment repeated for 1 hr. at 110° C. The completed catalyst component was washed with heptane and dried with nitrogen. The yield was 7.5 g and the catalyst component contained: Mg 14.00%, Ti 3.9%, Cl-51.0%, Ca 300 ppm, and $SO_4$-0.01%.

The catalyst component was used to polymerize propylene as in Example 1, and its activity was found to be 7.9 PP per g of catalyst. The bulk density was 0.29 g/ml, isotacticity 92.1%, and 90% of the particle distribution were in the range 0.2 to 1.0 mm.

While the invention has been described with particularity in the examples, the invention is not meant to be limited thereto.

I claim:

1. Method for manufacturing a catalyst component for α-olefine polymerizing catalysts comprising an organoaluminum compound, an external electron donor, and said component, which comprises
    (a) mixing an aqueous solution or alcoholic suspension of magnesium sulfate with an aqueous or alcoholic solution of barium chloride or calcium chloride,
    (b) separating the undissolved material therefrom,
    (c) evaporating the remaining solution until dry,
    (d) heating the thus-obtained residue to a temperature of about 130°-150° C.,
    (e) dissolving the thus-heated salt residue in alcohol,
    (f) subjecting the thus-obtained alcoholic solution to azeotropic distillation to remove crystallized water therefrom,
    (g) precipitating the solid component from the remaining solution, thereby forming said catalyst component, and (h) reacting the thus-precipitated magnesium component with a titanium halide.
2. The method of claim 1, additionally comprising
(h) reacting the thus-precipitated magnesium component with a titanium halide in the presence of an internal electron donor.

3. The method of claim 1, wherein
(f) the alcoholic solution is subjected to 1-15 runs of azeotropic distillation.
4. The method of claim 1, wherein the alcohol is ethanol.